(12) United States Patent
Nakao

(10) Patent No.: US 11,111,860 B1
(45) Date of Patent: Sep. 7, 2021

(54) WORK VEHICLE

(71) Applicant: Kubota Corporation, Osaka (JP)

(72) Inventor: Kohta Nakao, Sakai (JP)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 17/095,716

(22) Filed: Nov. 11, 2020

(30) Foreign Application Priority Data

Mar. 6, 2020 (JP) .............................. JP2020-038641

(51) Int. Cl.
*F02D 9/02* (2006.01)
*B60K 26/04* (2006.01)

(52) U.S. Cl.
CPC ................ *F02D 9/02* (2013.01); *B60K 26/04* (2013.01); *F02D 2009/0201* (2013.01)

(58) Field of Classification Search
CPC ......... Y10T 74/20528; Y10T 74/20888; Y10T 74/20534; G05G 1/405; G05G 1/30; B60T 11/046
USPC ....................................................... 123/342
See application file for complete search history.

(56) References Cited

U.S. PATENT DOCUMENTS

| | | | | |
|---|---|---|---|---|
| 5,351,573 A * | 10/1994 | Cicotte | .................. | G05G 1/405 74/512 |
| 5,460,061 A * | 10/1995 | Redding | ................. | B60K 26/02 74/512 |
| 6,305,239 B1 * | 10/2001 | Johansson | ............... | G05G 1/323 180/334 |
| 6,431,022 B1 * | 8/2002 | Cicotte | .................. | G05G 1/405 74/512 |
| 7,146,876 B2 * | 12/2006 | Willemsen | ............. | G05G 1/405 74/512 |

FOREIGN PATENT DOCUMENTS

JP   H542650 U   6/1993
JP   201595245 A   5/2015

* cited by examiner

*Primary Examiner* — Long T Tran
*Assistant Examiner* — James J Kim
(74) *Attorney, Agent, or Firm* — The Webb Law Firm

(57) ABSTRACT

The work vehicle includes: an operation tool through which opening and closing of a throttle valve is operated in accordance with a swing angle of the operation tool; a cable connected to the throttle valve; a cam which is supported by the operation tool and swingable about a first shaft supported by the vehicle body in accordance with an operation amount of the operation tool; a curved face which is an outer face of the cam and includes an end part region and a remaining region, the end part region having a curvature smaller than a curvature of the remaining region; and a link member which is connected to the cable, brought into contact with the curved face of the cam, and swingable along the curved face about a second shaft supported by the vehicle body in accordance with sing of the cam.

4 Claims, 8 Drawing Sheets

WORK VEHICLE

CROSS-REFERENCE TO RELATED APPLICATION

This application claims priority to Japanese Patent Application No. 2020-038641 filed Mar. 6, 2020, the disclosure of which is hereby incorporated by reference in its entirety.

BACKGROUND OF THE INVENTION

1. Field of the Invention

The present invention relates to a work vehicle that travels while a vehicle traveling speed is adjusted through an accelerator operation.

2. Description of Related Art

As shown in Japanese Unexamined Patent Application Publication No. 2015-95245, in a work vehicle such as utility vehicle (UV), a vehicle traveling speed is adjusted in accordance a treading amount of an accelerator pedal during traveling. The vehicle traveling speed is adjusted by increase and decrease of output of an engine mounted on the work vehicle, and the output of the engine is adjusted by a speed governing lever interlocking with the accelerator pedal.

In order to improve an operability of the accelerator pedal relative to the adjustment of the output of the engine, in some cases, an amount of the output of the engine is non-linearly changed relative to the operation amount of the accelerator pedal.

For example, as shown in Japanese Unexamined Utility Model Application Publication No. H5-42650, a cam lever fixed to a first pulley around which the accelerator wire is wound, and a link lever of a second pulley around which a slot wire (accelerator cable) is wound, are connected in a state in which an engagement pin of the link lever is engaged in a L-shaped elongate hole formed in the cam lever. With this configuration, the amount of change of the output of the engine relative to the operation amount of the accelerator pedal connected to the accelerator wire becomes non-linear.

SUMMARY OF THE INVENTION

However, it has been demanded to secure excellent operability with a simpler structure. Accordingly, an object of the present invention is to secure excellent operability with a simple structure.

In order to achieve the above object, the work vehicle according to one or more embodiments of the present invention includes: an engine in which an amount of intake air to be supplied thereto is adjusted by opening and closing of a throttle valve;

an operation tool which is swingably supported by the vehicle body and through which opening and closing of the throttle valve is operated in accordance with a swing angle of the operation tool;

a cable connected to the throttle valve;

a cam which is supported by the operation tool and swingable about a first shaft supported by the vehicle body in accordance with an operation amount of the operation tool;

a curved face which is an outer face of the cam and includes an end part region and a remaining region, the end part region having a curvature smaller than a curvature of the remaining region, and a link member which is connected to the cable, brought into contact with the curved face of the cam, and swingable along the curved face about a second shaft supported by the vehicle body in accordance with swing of the cam, wherein the cable is pulled in accordance with a swing amount of the link member, opening and closing of the throttle valve is adjusted in accordance with a pulled amount of the cable, and as a swing amount of the operation tool becomes larger, the link member swings farther along the curved face in a direction from the end part region to the remaining region.

With this configuration, at the start of the swing of the operation tool, the cam presses the link member while the cam and the link member are brought into contact with each other in the end part region of the curved face, and the cable is pulled. As the operation tool is swung further to a greater degree, the cam presses the link member while the cam and the link member are brought into contact with each other in the remaining region of the curved face, and the cable is further pulled. Since the curvature of the end part region is smaller than the curvature in the remaining region, the amount of the swing of the link member pressed at the start of the swing of the operation tool is smaller than the amount of the swing of the link member when the operation tool is in a state of being swung to a greater degree. Accordingly, the pulled amount of the cable becomes smaller in a state in which the operation tool is started to swing than in a state in which the operation tool has been swung to a greater degree, and a stroke of the cable relative to the swing amount of the operation tool becomes nonlinear. Further, the opening and closing amounts of the throttle valve become smaller in a state in which the operation tool is stated to swing than in a state in which the operation tool has been swung to a greater degree, and the amount of intake air to be supplied to the engine becomes smaller at the start. As a result, with a simple combination of the cam and the link member, the work vehicle is prevented from suddenly starting to travel, or the adjustment of the vehicle speed during traveling on a rough road is prevented from becoming difficult, leading to excellent operability of the accelerator.

According to another aspect of one or more embodiments of the present invention, in the curved face, the remaining region may have a curvature which is constant, and the end part region may have a curvature which increases toward the remaining region.

With this configuration, the pulled amount of the cable at the start of the swing of the operation tool is small, and then as the operation amount of the operation tool becomes larger, the stroke of the cable relative to the operation amount of the operation tool becomes gradually larger. Accordingly, the amount of the output of the engine becomes smoothly increased relative to the operation of the operation tool, leading to more excellent operability of the accelerator.

According to still another aspect of one or more embodiments of the present invention, the work vehicle may further include a first elastic body having one end supported by the vehicle body and the other end supported by the operation tool; and a second elastic body biasing the link member toward the cam, wherein in a state in which the operation tool is not operated, the link member is brought into contact with the end part region of the curved face, and when the operation amount of the operation tool becomes larger than a predetermined amount, the link member is brought into contact with the remaining region of the curved face.

With this configuration, in a state in which the operation tool is not operated, the cable is not pulled, and as the operation tool is operated more, the position at which the cam and the link member are brought into contact with each other shifts from the end part region to the remaining region with high precision. Accordingly, the stroke of the cable relative to the swing amount of the operation tool becomes nonlinear with high precision, and excellent operability of the accelerator can be secured.

According to further aspect of one or more embodiments of the present invention, the work vehicle may further include a body frame, wherein the operation tool, the first shaft, and the second shaft are supported by the vehicle body via the body frame.

DETAILED DESCRIPTION OF PREFERRED EMBODIMENTS

Hereinbelow, the work vehicle of the present invention will be described with reference to the drawings while a multipurpose work vehicle (UV) is taken as an example.

Figure 1:
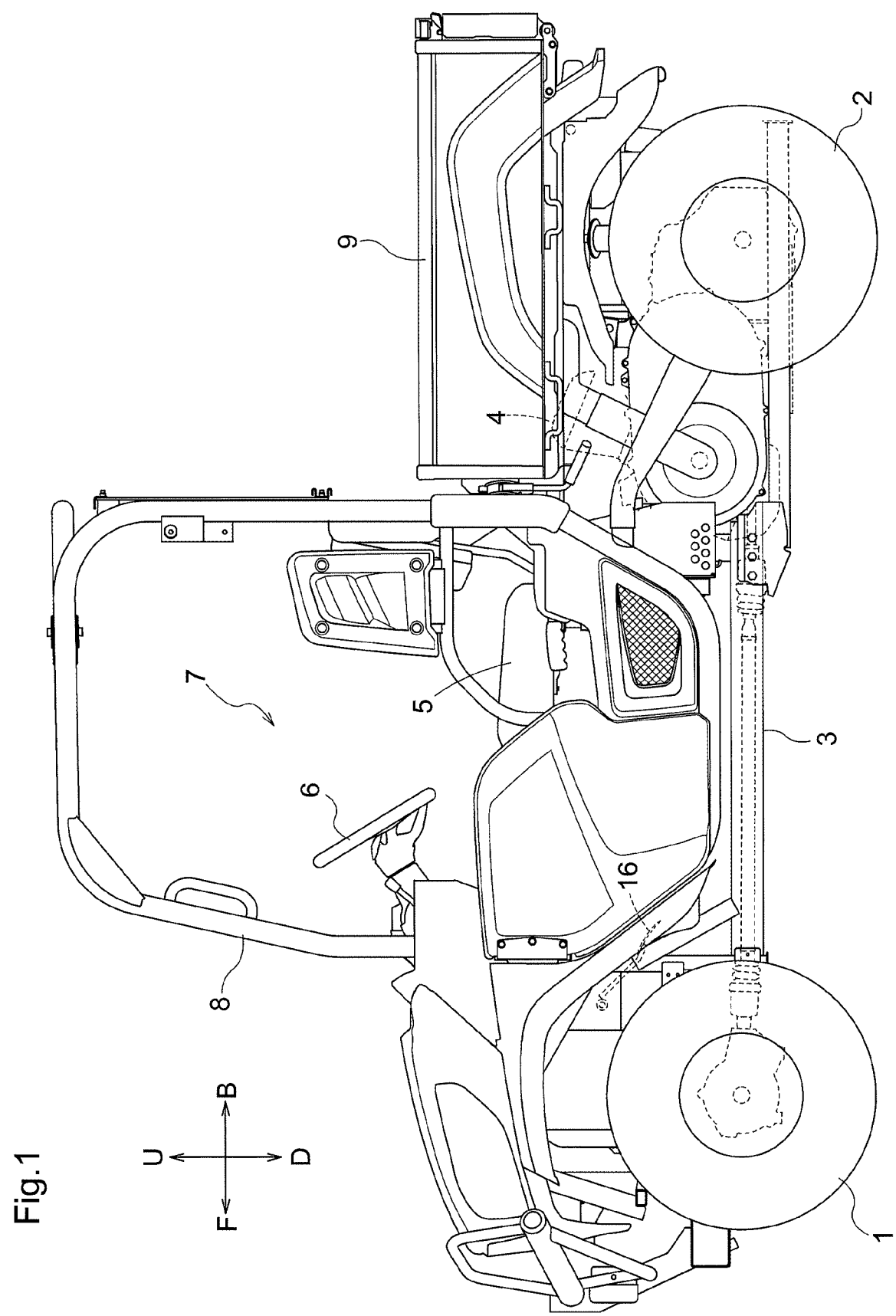
FIG. 1 is a left side view of a multipurpose work vehicle.

In the following descriptions, regarding a traveling vehicle body of the multipurpose work vehicle, a direction indicated with an arrow F in FIG. 1 is taken as "frontward of the vehicle body", a direction indicated with an arrow B is taken as "rearward of the vehicle body", a direction indicated with an arrow U is taken as "upward of the vehicle body", a direction indicated with an arrow D is taken as "downward of the vehicle body", a front side of the drawing sheet is taken as "leftward of the vehicle body", and a rear side of the drawing sheet is taken as "rightward of the vehicle body".

[Entire Configuration of the Multipurpose Work Vehicle]

As shown in FIG. 1, the multipurpose work vehicle as a traveling device includes a pair of right and left front wheels 1 which are steerable and drivable, and a pair of right and left rear wheels 2 which are drivable. The multipurpose work vehicle includes a driving part 7 between the front wheels 1 and the rear wheels 2. The driving part 7 includes a driver's seat 5, a steering wheel 6 for steeling the front wheels 1, and the like. The driving part 7 is provided with a ROPS 8 surrounding a riding space. The multipurpose work vehicle includes a truck box 9 on a rear portion of a body frame 3. The multipurpose work vehicle has an engine 4 below the truck box 9, and power of the engine 4 is transmitted to the front wheels 1 and the rear wheels 2 to thereby allow the work vehicle to travel.

Figure 2:
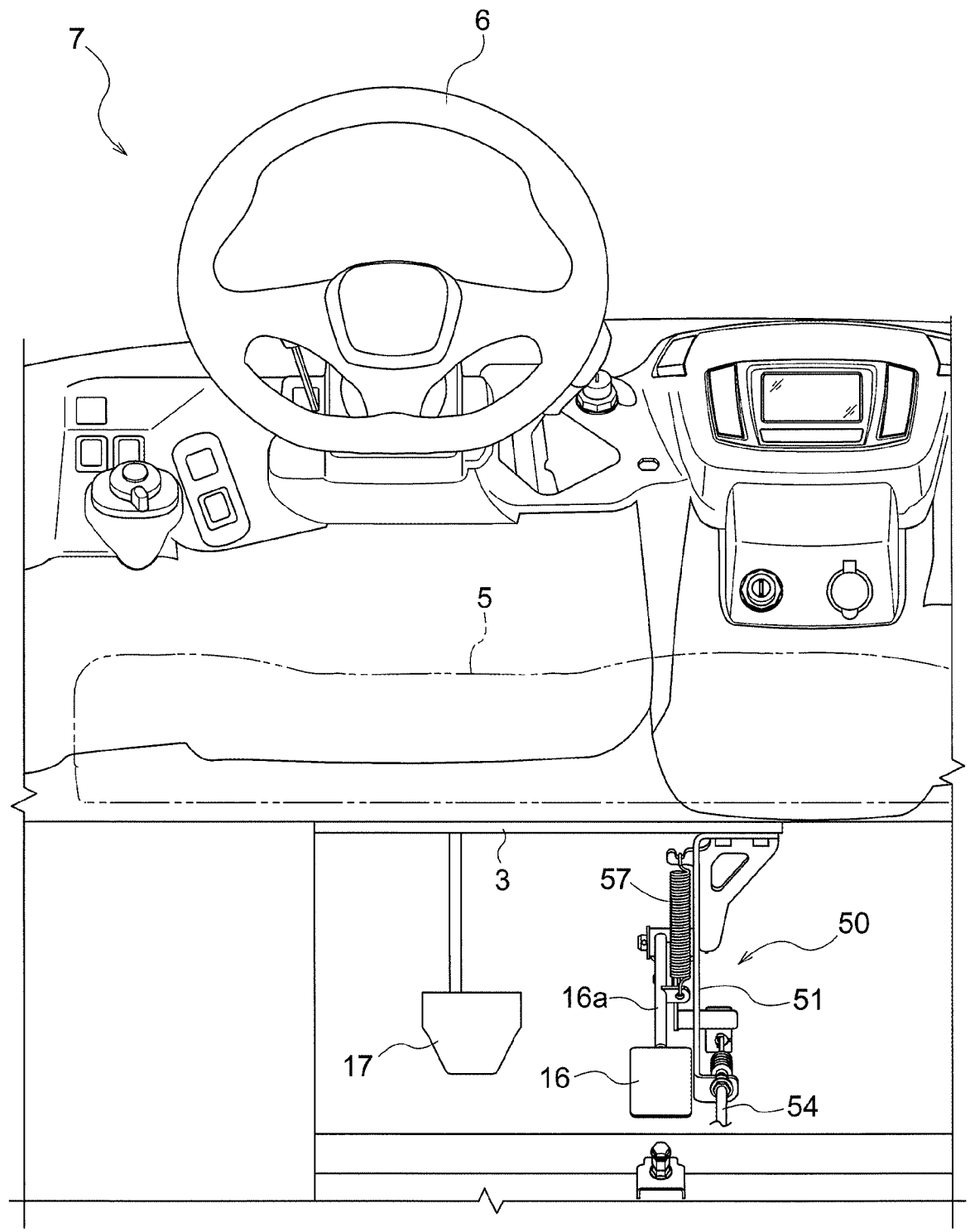
FIG. 2 illustrates a configuration of a foot area of a driving part.

As shown in FIGS. 1 and 2, downward of the steering wheel 6 and frontward of the driver's seat 5 in the driving part 7, there are disposed an accelerator pedal 16 (corresponding to "operation tool") and a brake pedal 17 which are operable by a foot of a driver sitting on the driver's seat 5. The accelerator pedal 16 is connected to the engine 4 and adjusts an output of the engine 4 through adjustment of an amount of intake air to be supplied to the engine 4. The brake pedal 17 is used for braking operation of the multipurpose work vehicle.

Figure 3:
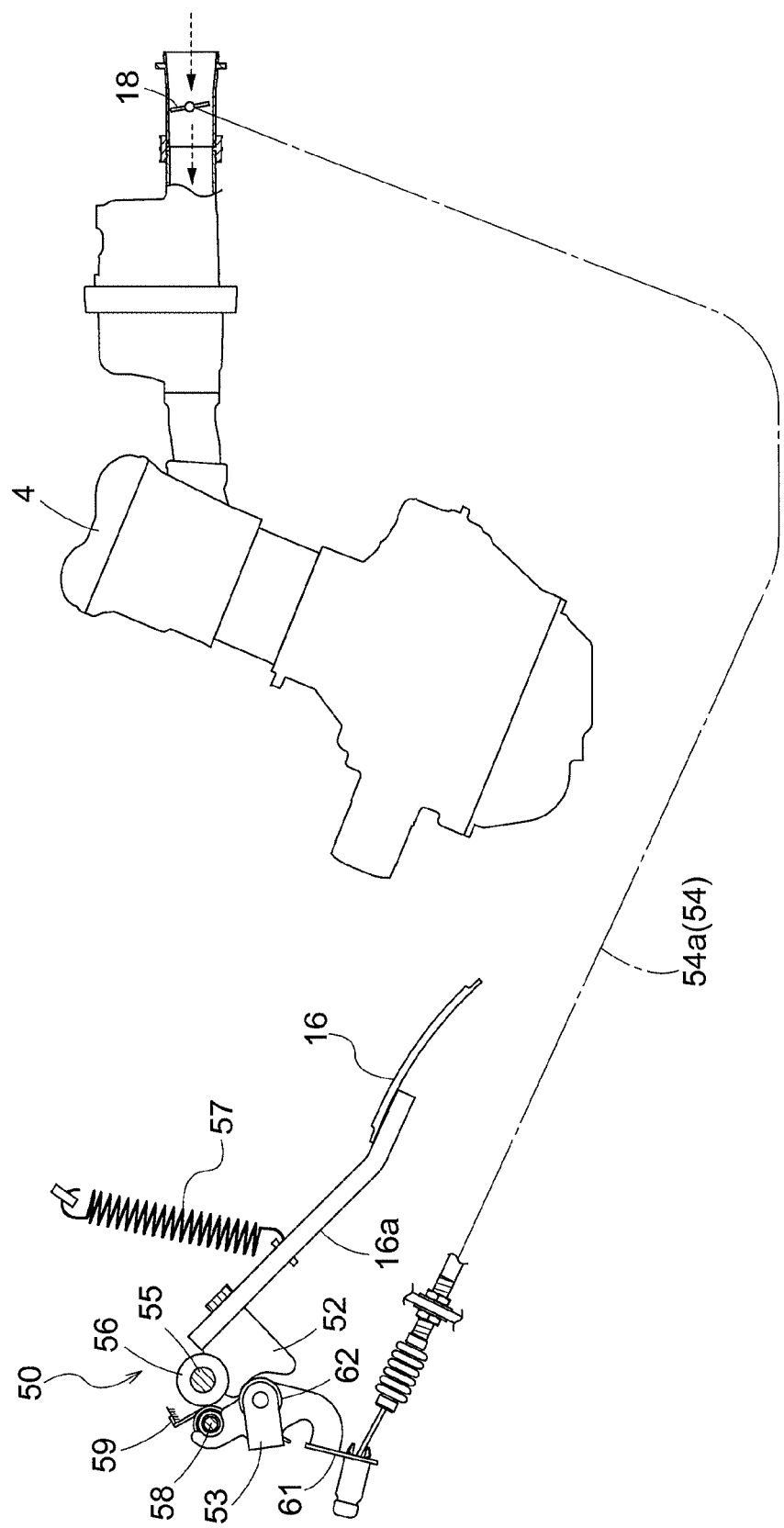
FIG. 3 is a schematic view of a configuration for adjusting intake air to be supplied to an engine.

Specifically, as shown in FIG. 3, the accelerator pedal 16 is connected to a throttle valve 18 of the engine 4 via an accelerator cable 54 (corresponding to "cable") of an accelerator mechanism which will be described later. The throttle valve 18 is opened or closed in accordance with an operation amount of the accelerator pedal 16 to thereby adjust the amount of intake air to be supplied to the engine 4, which in turn adjusts an output of the engine 4.

[Accelerator Mechanism]

Figure 4:
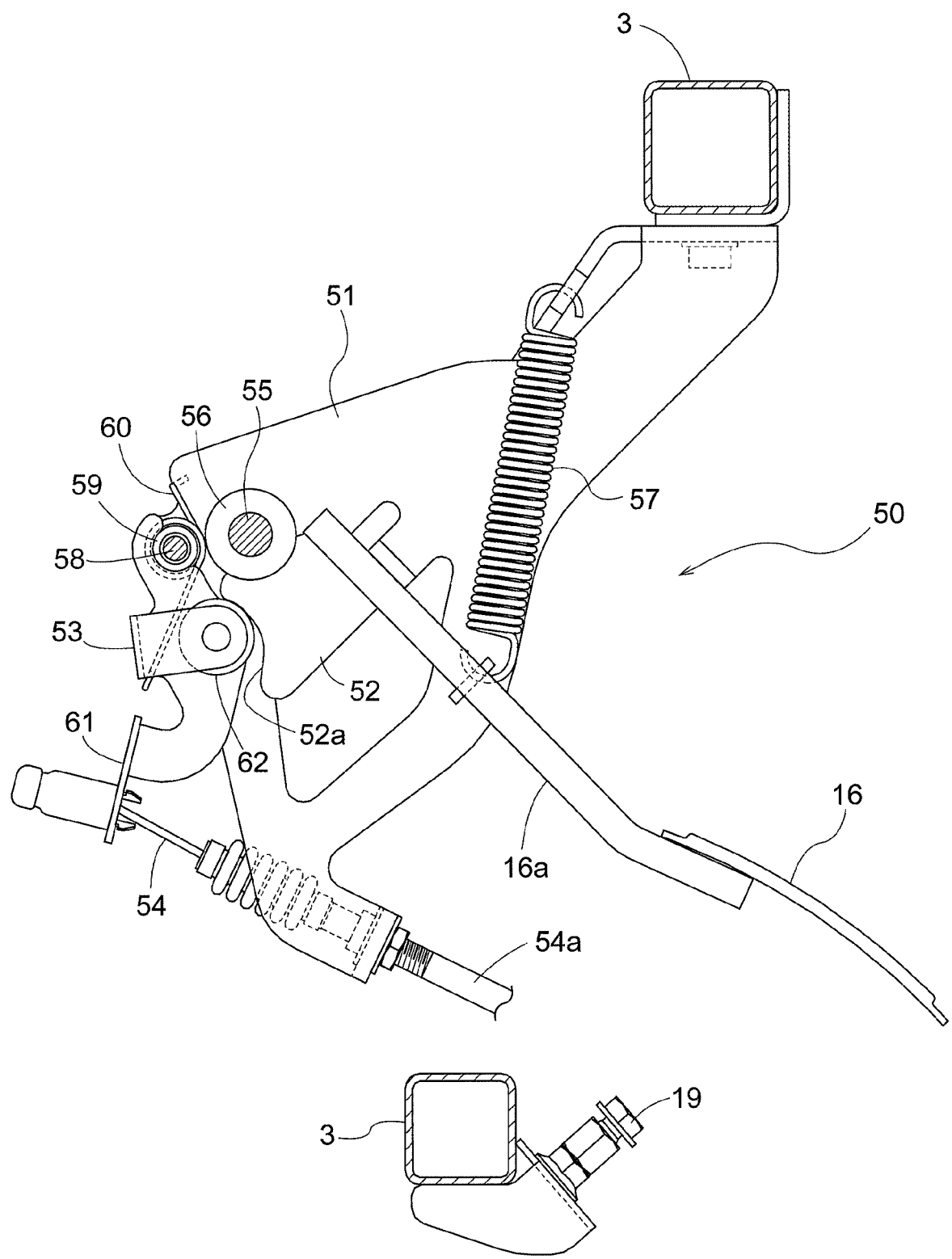
FIG. 4 is a left side view illustrating a configuration of an accelerator mechanism.
Figure 5:
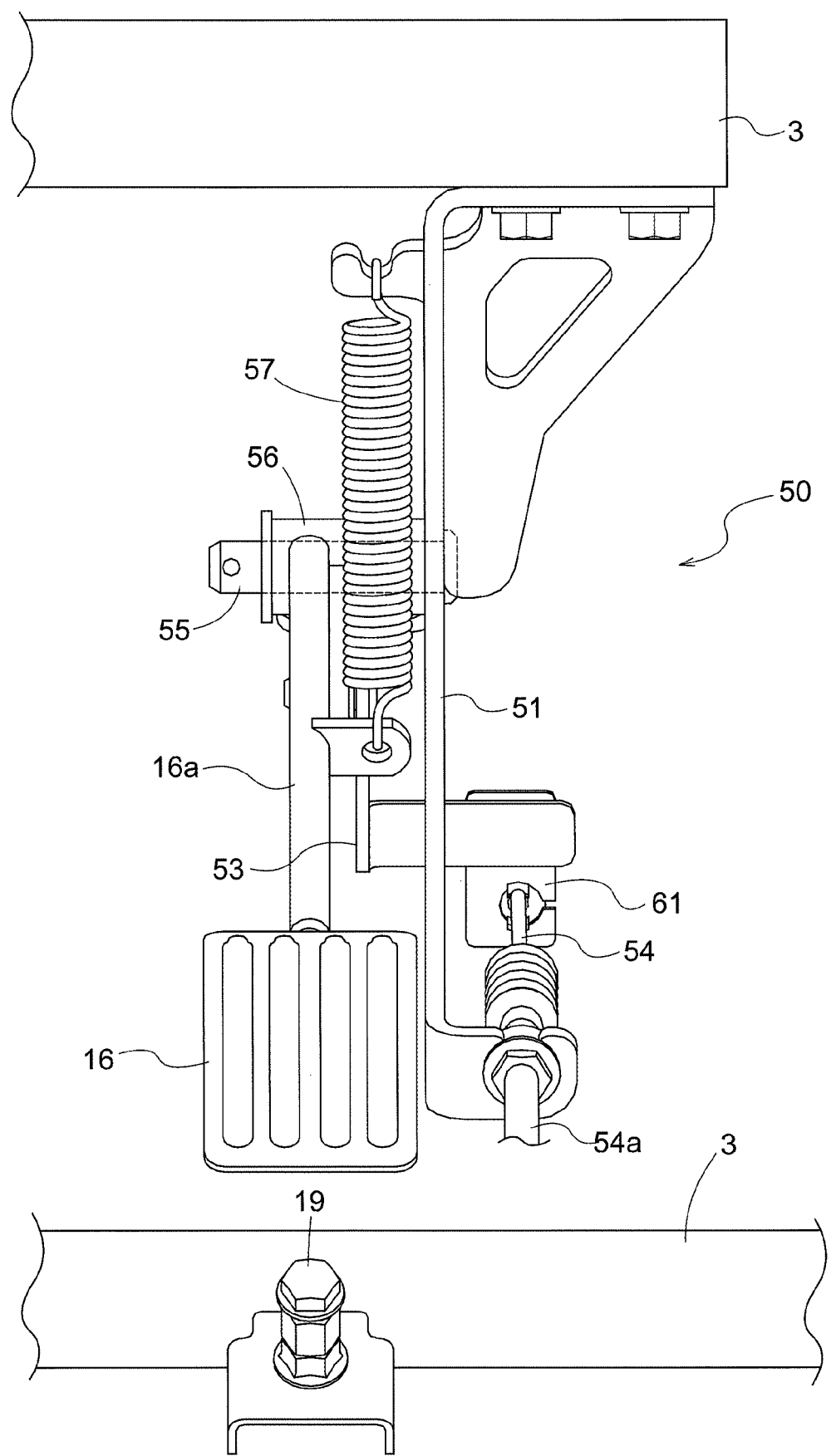
FIG. 5 is a rear view illustrating a configuration of the accelerator mechanism.
Figure 6:
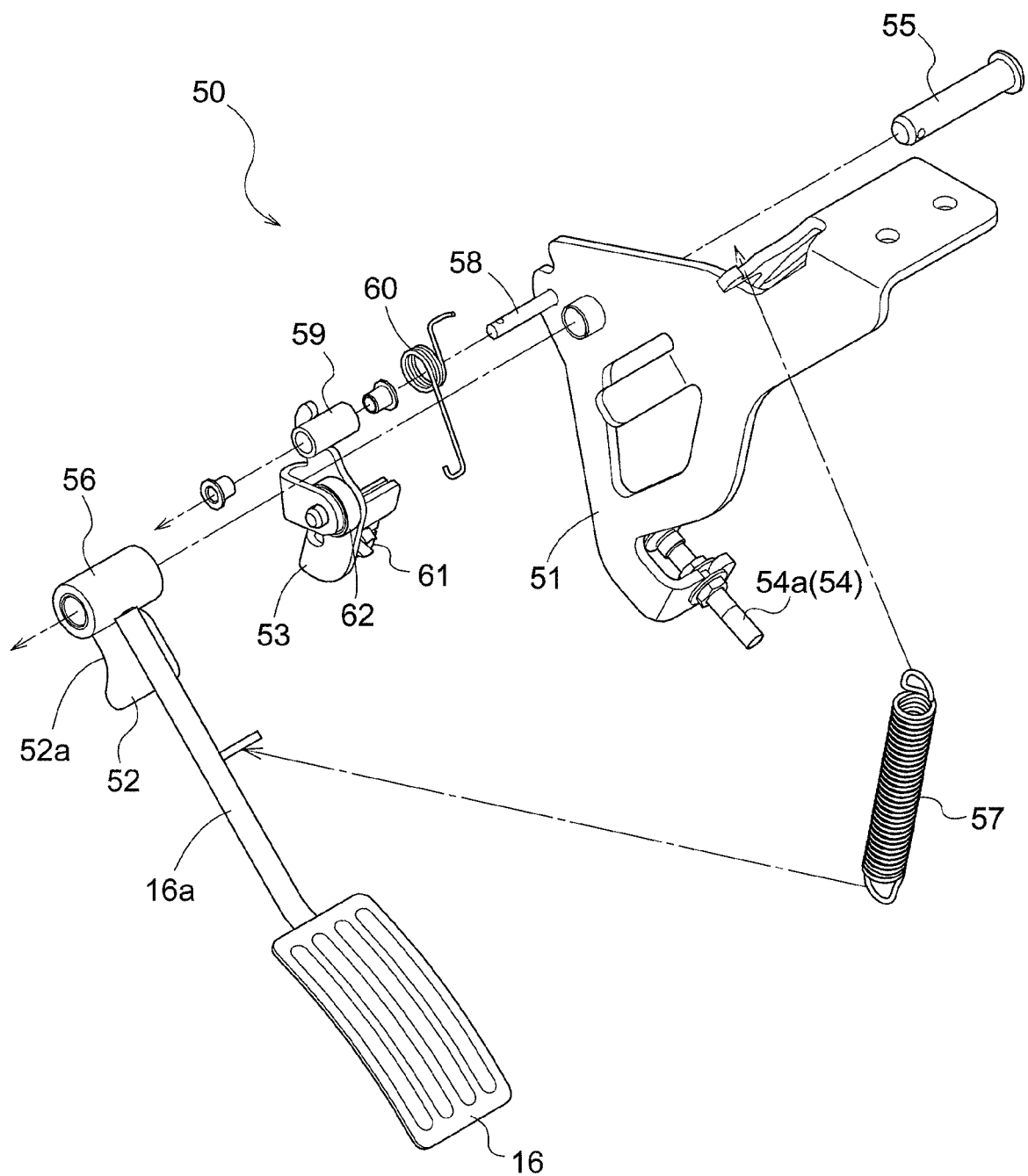
FIG. 6 is an exploded perspective view illustrating the accelerator mechanism.

As shown in FIGS. 4 to 6, an accelerator mechanism 50 including the accelerator pedal 16 is held by the body frame 3. The accelerator mechanism 50 includes a bracket 51, a cam 52, and a link member 53, in addition to the accelerator pedal 16 and the accelerator cable 54.

The bracket 51 is fixed to the body frame 3. The bracket 51 has a shaft 55 (corresponding to "first shaft") projecting from the bracket 51 in a vehicle body leftward direction. Onto the shaft 55, a cylindrical supporting member 56 rotatable about the shaft 55 is fitted. The cam 52 is fixed to the supporting member 56, and a rod 16a of the accelerator pedal 16 is fixed to the cam 52. With this configuration, the accelerator pedal 16 is swingable about the shaft 55 in a vehicle body vertical direction. In addition, the accelerator pedal 16 is provided with a spring 57 (corresponding to "first elastic body") which biases the accelerator pedal 16 in a vehicle body upward direction. One end of the spring 57 is supported by the rod 16a of the accelerator pedal 16 and the other end is supported at a position higher than the shaft 55 of the bracket 51.

The bracket 51 also has a shaft 58 (corresponding to "second shaft") projecting from the bracket 51 in a vehicle body leftward direction at a position forwardly of the shaft 55. Onto the shaft 58, a cylindrical supporting member 59 rotatable about the shaft 58 is fitted. The supporting member 59 is fixed to an upper portion of the link member 53. Around the shaft 58, a torsion coil spring 60 (corresponding to "second elastic body") is wound. One end of the torsion coil spring 60 is supported by the bracket 51, and the other end is supported by the link member 53. With this configuration, the link member 53 is biased toward the cam 52. The link member 53 is bent in a vehicle body rightward direction, and the bent portion is connected to a distal end portion of the accelerator cable 54 via a stay 61. The accelerator cable 54 is covered with a cable cover 54a except for the distal end portion connected to the stay 61, and the cable cover 54a is supported by the bracket 51. Though not shown, the accelerator cable 54 is biased toward the engine 4 (see FIG. 1). In addition, the link member 53 further bent at a middle portion thereof in a U-shape manner, and between two facing bent portions, a bearing 62 is rotatably supported by a shaft. The bearing 62 projects from the link member 53 toward the cam 52, and comes into contact with a side face 52a (corresponding to "curved face") of the cam 52 which is a face on a front side (outer face) of the cam 52. In addition, a regulating tool 19 is provided below the accelerator pedal 16 of the body frame 3. A range of a downward swing of the accelerator pedal 16 is limited by the regulating tool 19.

Figure 7:
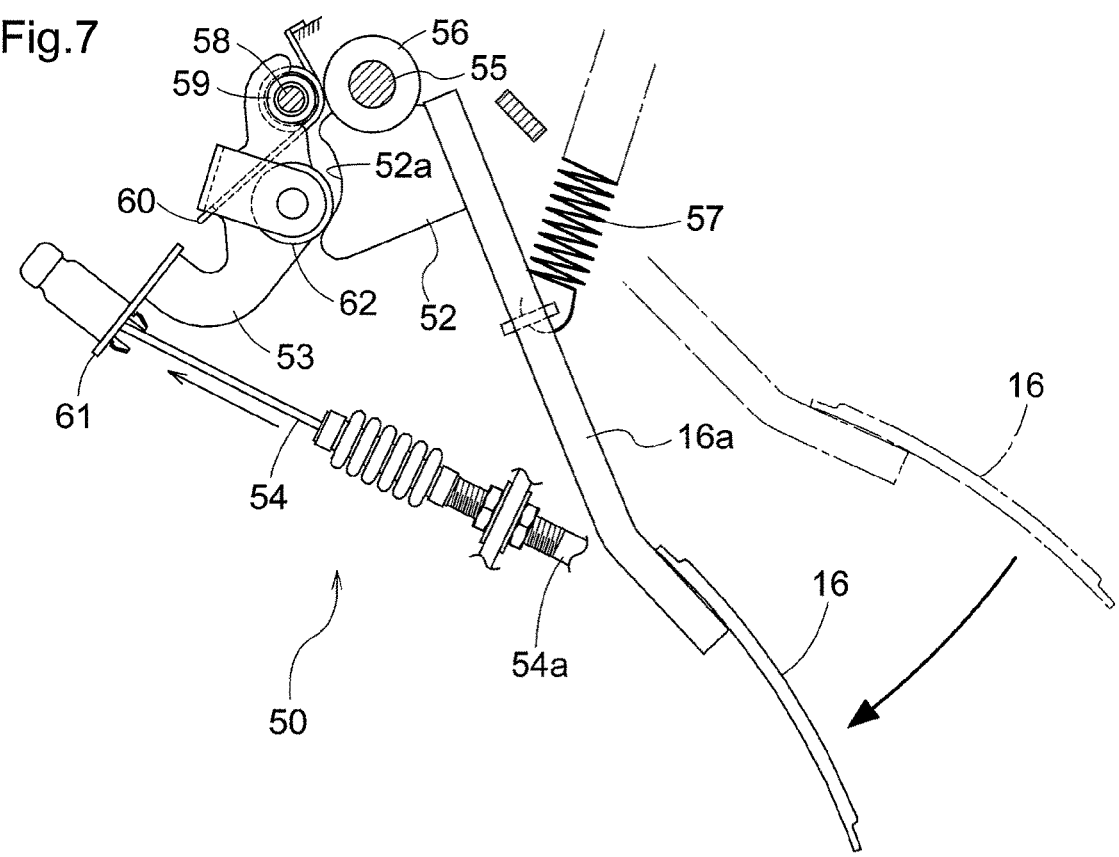
FIG. 7 depicts a state of the accelerator mechanism in which an accelerator pedal is pressed.
Figure 8:
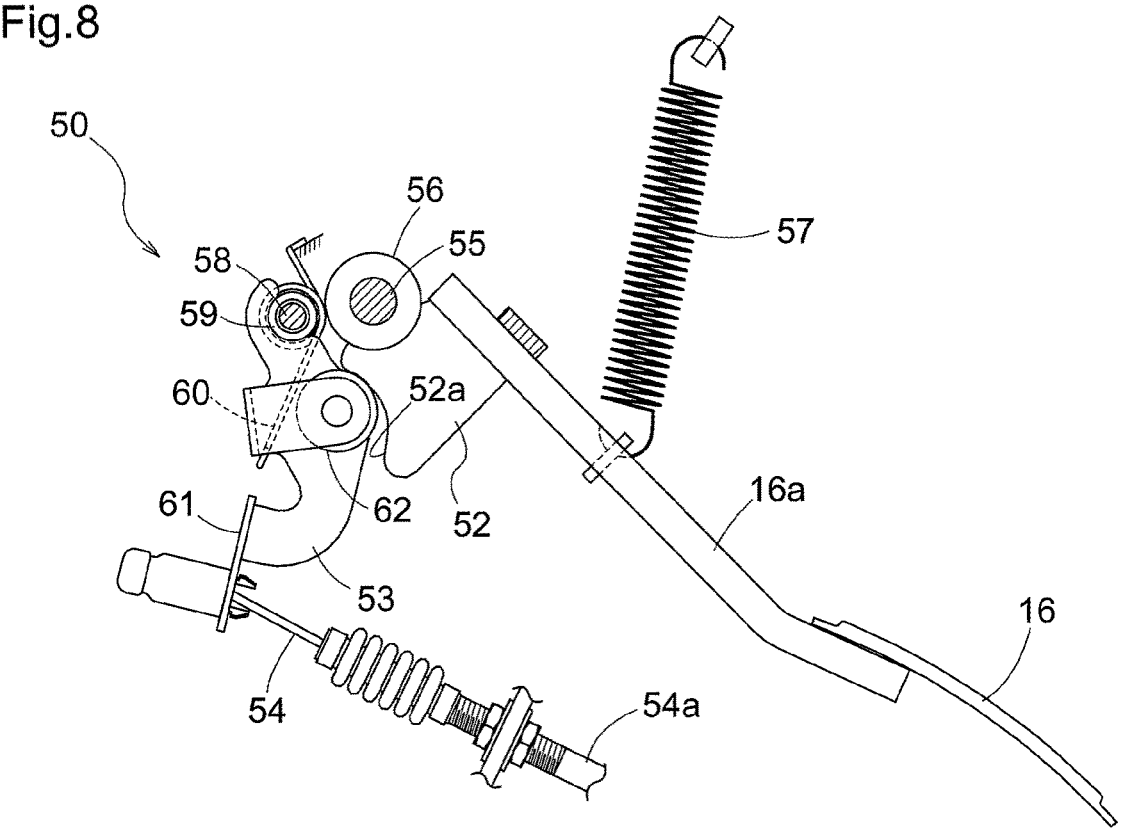
FIG. 8 depicts a state of the accelerator mechanism in which the accelerator pedal is not pressed.

As shown in FIGS. 7 and 8, as the accelerator pedal 16 is swung, the cam 52 presses the bearing 62 of the link member 53, and the link member 53 is swung in a vehicle body front-rear direction about the shaft 58. During this movement, while the bearing 62 rotates about the shaft 58, the bearing 62 smoothly moves along the side face 52a of the cam 52. The more the accelerator pedal 16 is pressed, the farther the contact position of the bearing 62 shifts from a vehicle body upward side to a vehicle body downward side of the cam 52, and the link member 53 is pushed in a vehicle body forward direction. With this configuration, as the link member 53 is swung in the vehicle body forward direction, the accelerator cable 54 is pulled and an intake volume of the engine 4 (see FIG. 1) is increased to raise an output (a state shown in FIG. 7), and as the link member 53 is swung in the vehicle body rearward direction, the accelerator cable 54 is returned and the intake volume of the engine 4 (see FIG. 1) is reduced to lower the output (a state shown in FIG. 8).

Figure 9:
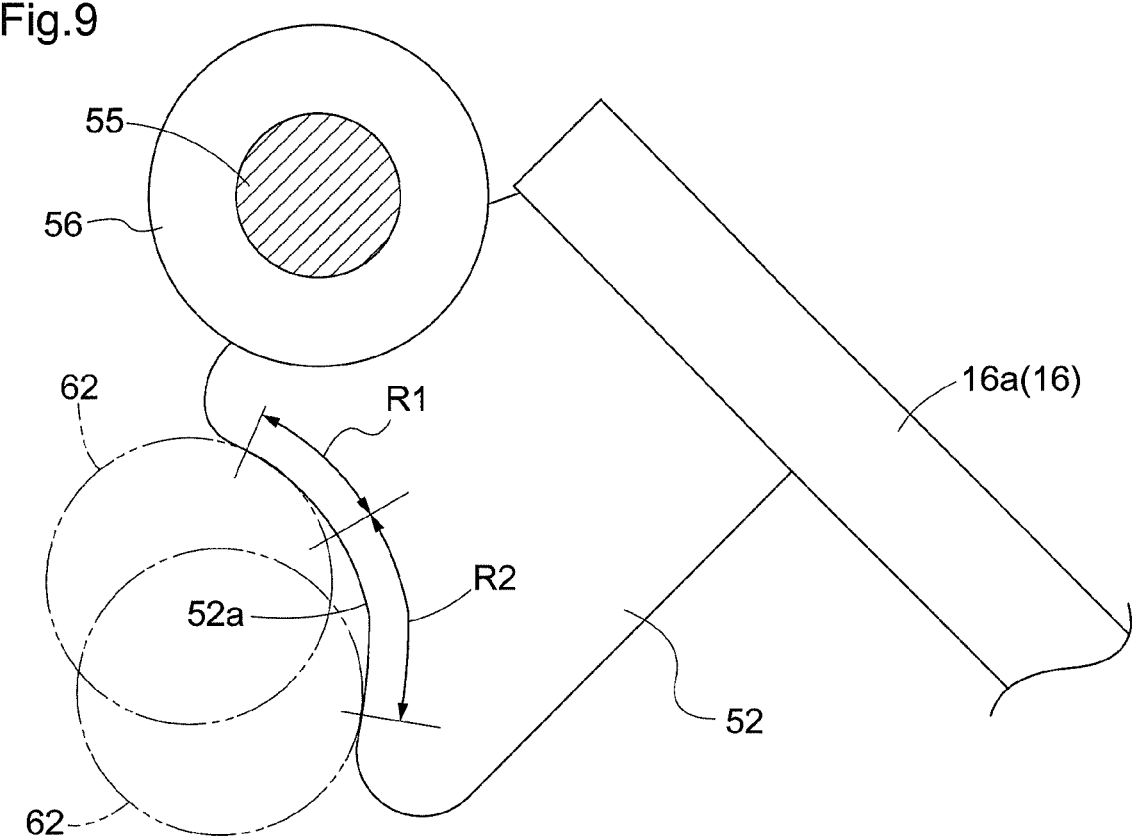
FIG. 9 is a schematic view showing the configuration of a cam.

As shown in FIG. 9, the bearing 62 of the link member 53 comes into contact with the side face 52a of the cam 52. The side face 52a is curved in such a manner that a curvature of an upper portion R1 (corresponding to "end part region") thereof is smaller than a curvature of a lower portion R2 (corresponding to "remaining region") thereof. For example, each of the curvature of the upper portion R1 and the curvature of the lower portion R2 is constant, and at the same time the curvature of the upper portion R1 is smaller than the curvature of the lower portion R2. Another example is that the curvature of the upper portion R1 increases toward the lower portion R2 and the curvature of the lower portion R2 is constant. Still another example is that in the entirety including the upper portion R1 and the lower portion R2, the curvature increases gradually from the upper side to the lower side.

With this configuration, a magnitude of the swing of the link member 53 caused in association with the swing of the accelerator pedal 16 when the upper portion R1 of the side face 52a having a smaller curvature is brought into contact with the bearing 62 is smaller than a magnitude of the swing of the link member 53 caused in association with the swing of the accelerator pedal 16 when the lower portion R2 of the side face 52a having a larger curvature is brought into contact with the bearing 62. In addition, the larger the treading amount of the accelerator pedal 16 is, the larger the magnitude of the swing of the link member 53 is. As a result, a pulled amount of the accelerator cable 54 relative to a swing amount of the accelerator pedal 16 at the start of the pressing of the accelerator pedal 16 becomes smaller than a pulled amount of the accelerator cable 54 relative to a swing amount of the accelerator pedal 16 after the pressing of the accelerator pedal 16 to a certain amount or more. Accordingly, the pulled amount of the accelerator cable 54 relative to the treading amount of the accelerator pedal 16 becomes small at the start, and the pulled amount of the accelerator cable 54 relative to the treading amount of the accelerator pedal 16 changes nonlinearly.

Figure 10:
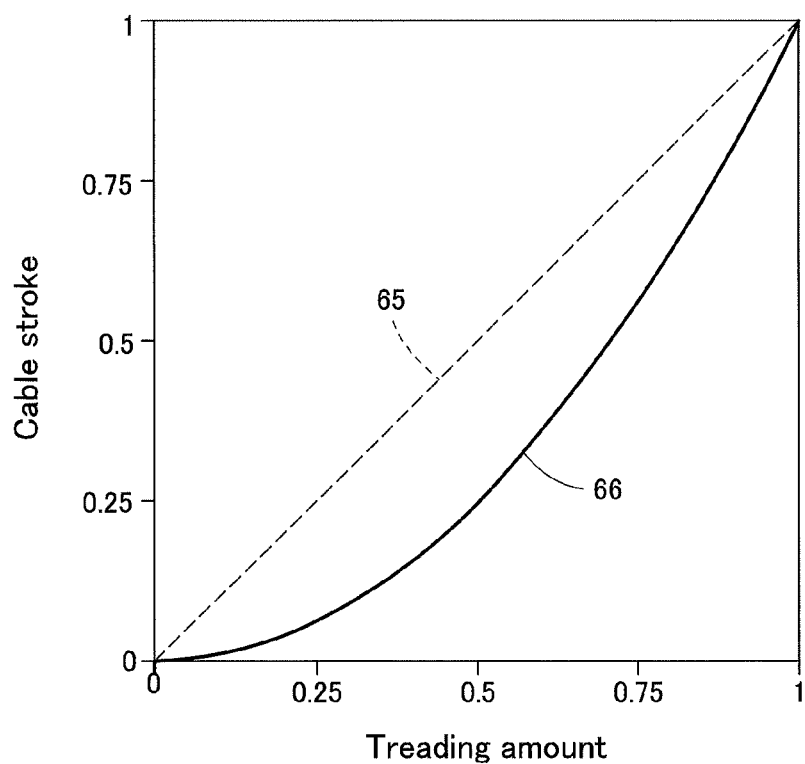
FIG. 10 is a graph showing a relation between a treading amount of the accelerator pedal and a stroke of the accelerator cable.

FIG. 10 is a graph showing a relation between the treading amount of the accelerator pedal 16 and the pulled amount of the accelerator cable 54 (stroke of the accelerator cable 54). In FIG. 10, a line 65 shows a change in the stroke of the accelerator cable 54 in prior art in which the accelerator pedal 16 and the accelerator cable 54 are directly connected, and a curve 66 shows a change in the stroke of the accelerator cable 54 in the present embodiment.

As shown in the line 65, in a configuration with which the stroke of the accelerator cable 54 is proportional to the treading amount of the accelerator pedal 16, the stroke of the accelerator cable 54 increases in a manner of straight line (linearly) as the accelerator pedal 16 is pressed more. Accordingly, at the start of the pressing of the accelerator pedal 16, the output of the engine 4 (see FIG. 1) suddenly increases. In this manner, if the engine 4 (see FIG. 1) responds sensitively to the accelerator work at the start of pressing of the accelerator pedal 16, the multipurpose work vehicle may start suddenly, or the adjustment of vehicle speed during traveling on a rough road may become difficult, and the operability of the accelerator becomes poor.

On the other hand, as shown in the line 66, according to the accelerator mechanism of the present embodiment, at the start of the pressing of the accelerator pedal 16, the stroke of the accelerator cable 54 increases slowly, and afterward the amount of change of the stroke of the accelerator cable 54 relative to the treading amount of the accelerator pedal 16 is increased, and the relation between the treading amount of the accelerator pedal 16 and the stroke of the accelerator cable 54 becomes non-linear. Accordingly, the raise of the output of the engine 4 (see FIG. 1) at the start of the pressing of the accelerator pedal 16 becomes gradual. As a result, with a simple structure that the side face 52a of the cam 52 having the adjusted curvature presses the link member 53, a response to the engine 4 (see FIG. 1) relative to the accelerator work at the start of the pressing of the accelerator pedal 16 can be made gradual. Thus, according to the accelerator mechanism of the present embodiment, the multipurpose work vehicle is prevented from suddenly starting to travel, or the adjustment of the vehicle speed during traveling on a rough road is prevented from becoming difficult, and operability of the accelerator becomes excellent.

Other Embodiments (1) The arrangement and configuration of the accelerator pedal 16, the cam 52, and the link member 53 is not limited to those in the above embodiment, and any arrangement can be adapted, as long as the cam 52 swings in accordance with swing of the accelerator pedal 16 and the link member 53 is displaced along the side face 52a of the cam 52.

(2) In each of the above embodiments, any configuration of the link member 53 can be adapted, as long as the link member 53 is displaced along the side face 52a of the cam 52. For example, it is preferable to bring the link member 53 into contact with the side face 52a of the cam 52 via the bearing 62 because the displacement of the link member 53 becomes smooth, but the link member 53 may not be provided with the bearing 62 at the position where the link member 53 is brought into contact with the side face 52a of the cam 52.

(3) In each of the above embodiments, an elastic body other than the sprint 57 may be used for biasing the accelerator pedal 16 in the vehicle body upward direction.

(4) In each of the above embodiments, the operation tool for adjusting the output of the engine 4 is not limited to the accelerator pedal 16, and an operation tool with any configuration may be used, such as a lever capable of performing accelerator operation.

(5) In each of the above embodiments, the amount of change of the stroke of the accelerator cable 54 becomes small at the start of the pressing of the accelerator pedal 16, and afterward the amount of change becomes large, and once the amount of change becomes large to some extent, the amount of change may be either large or small. In other words, in the side face 52a of the cam 52, any curvature can be adapted to a lower end portion of the lower portion R2, as long as the curvature of the part of the lower portion R2 adjacent to the upper portion R1 is smaller than the curvature of the upper portion R1.

(6) In each of the above embodiments, the accelerator mechanism 50 including the accelerator pedal 16 and the bracket 51 is supported by the body frame 3, but it may be supported by the vehicle body directly in any arrangement or via any structural component. Accordingly, the shaft 55 and the shaft 58 provided to the bracket 51 may be supported by the vehicle body directly in any arrangement or via any structural component, and the spring 57 may be supported by the vehicle body directly in any arrangement or via any structural component.

INDUSTRIAL APPLICABILITY

The present invention is applicable not only to the multipurpose work vehicle, but also various work vehicles in which the output of the engine can be operable by the operation tool, such as the accelerator pedal.

REFERENCE SIGNS LIST 3 body frame
4 engine
16 accelerator pedal (operation tool)
18 throttle valve
52 cam
52a side face (curved face)
53 link member
54 accelerator cable (cable)
55 shaft (first shaft)
57 spring (first elastic body)
58 shaft (second shaft)
60 torsion coil spring (second elastic body)
R1 upper portion (end part region)
R2 lower portion (remaining region)

The invention claimed is:

1. A work vehicle comprising:
an engine in which an amount of intake air to be supplied thereto is adjusted by opening and closing of a throttle valve;
an operation tool which is swingably supported by the vehicle body and through which opening and closing of the throttle valve is operated in accordance with a swing angle of the operation tool;
a cable connected to the throttle valve;
a cam which is supported by the operation tool and swingable about a first shaft supported by the vehicle body in accordance with an operation amount of the operation tool;
a curved face which is an outer face of the cam and includes an end part region and a remaining region, the end part region having a curvature smaller than a curvature of the remaining region, and
a link member which is connected to the cable, brought into contact with the curved face of the cam, and swingable along the curved face about a second shaft supported by the vehicle body in accordance with swing of the cam,
wherein the cable is pulled in accordance with a swing amount of the link member, opening and closing of the throttle valve is adjusted in accordance with a pulled amount of the cable, and as a swing amount of the operation tool becomes larger, the link member swings farther along the curved face in a direction from the end part region to the remaining region.

2. The work vehicle according to claim 1, wherein in the curved face, the remaining region has a curvature which is constant, and the end part region has a curvature which increases toward the remaining region.

3. The work vehicle according to claim 1, further comprising:
a first elastic body having one end supported by the vehicle body and the other end supported by the operation tool; and
a second elastic body biasing the link member toward the cam,
wherein in a state in which the operation tool is not operated, the link member is brought into contact with the end part region of the curved face, and when the operation amount of the operation tool becomes larger than a predetermined amount, the link member is brought into contact with the remaining region of the curved face.

4. The work vehicle according to claim 1, further comprising a body frame, and
wherein the operation tool, the first shaft, and the second shaft are supported by the vehicle body via the body frame.

* * * * *